United States Patent
Devic

(10) Patent No.: US 7,060,244 B2
(45) Date of Patent: Jun. 13, 2006

(54) METHOD FOR DIRECTLY OBTAINING HYDROGEN PEROXIDE

(75) Inventor: Michel Devic, Sainte Foy les Lyon (FR)

(73) Assignee: Arkema, Puteaux (FR)

( * ) Notice: Subject to any disclaimer, the term of this patent is extended or adjusted under 35 U.S.C. 154(b) by 527 days.

(21) Appl. No.: 10/221,339

(22) PCT Filed: Feb. 15, 2001

(86) PCT No.: PCT/FR01/00449

§ 371 (c)(1),
(2), (4) Date: Sep. 10, 2002

(87) PCT Pub. No.: WO01/68519

PCT Pub. Date: Sep. 20, 2001

(65) Prior Publication Data

US 2003/0086853 A1    May 8, 2003

(30) Foreign Application Priority Data

Mar. 17, 2000  (FR) ................... 00 03438

(51) Int. Cl.
*C01B 15/029* (2006.01)

(52) U.S. Cl. ..................................... 423/584
(58) Field of Classification Search ................. 423/584
See application file for complete search history.

(56) References Cited

U.S. PATENT DOCUMENTS

| 4,772,458 A | | 9/1988 | Gosser et al. |
| 4,900,468 A | * | 2/1990 | Mitchell et al. ................ 8/648 |
| 5,180,514 A | * | 1/1993 | Farr et al. .............. 252/186.29 |
| 5,180,573 A | | 1/1993 | Hiramatsu et al. |
| 5,194,242 A | | 3/1993 | Paoli |
| 5,641,467 A | | 6/1997 | Huckins |
| 6,042,804 A | * | 3/2000 | Huckins ..................... 423/584 |

FOREIGN PATENT DOCUMENTS

| EP | 0351772 | * | 1/1990 | ................ 423/584 |
| EP | 0 930 269 A1 | | 7/1999 | |
| WO | WO 99/41190 | | 8/1999 | |

OTHER PUBLICATIONS

Fu et al., "Selective Oxidation of Hydrogen to Hydrogen Peroxide," Studies in Surface Science and Catalysis, NL, Elseveier Science B.V., Amsterdam, vol. 72, 1992, pp. 33-41, no month.

* cited by examiner

*Primary Examiner*—Wayne A. Langel
(74) *Attorney, Agent, or Firm*—Steven D. Boyd

(57) ABSTRACT

The invention concerns a method for making an aqueous solution of hydrogen peroxide. More particularly, it concerns a method for making hydrogen peroxide directly from hydrogen and oxygen, finely dispersed in an aqueous acid medium comprising a catalyst and at least a surfactant. The invention also concerns a device for implementing said method.

22 Claims, 3 Drawing Sheets

METHOD FOR DIRECTLY OBTAINING HYDROGEN PEROXIDE

The present invention relates to a process for the manufacture of an aqueous hydrogen peroxide solution. More particularly, a subject matter of the invention is a process for the manufacture of hydrogen peroxide directly from hydrogen and oxygen, both dispersed in an aqueous reaction medium, in the presence of a catalyst. Another subject matter of the present invention is a device for the implementation of said process.

A process for the manufacture of hydrogen peroxide directly from hydrogen and oxygen, according to which the hydrogen and the oxygen are dispersed in an aqueous reaction medium at acidic pH, was disclosed in international applications WO 92/04277 and Wo 96/05138 and patent application FR 2 774 674.

The process disclosed in these international applications is carried out in a tube reactor completely filled with a working solution in which the hydrogen and the oxygen are dispersed, whereas that of the French patent application is carried out in a stirred reactor comprising a liquid phase comprising the working solution and a continuous gas phase.

The working solution used both for the process in the tube reactor and for that in the stirred reactor comprises water, acid and optionally decomposition inhibitors or stabilizers for hydrogen peroxide.

The hydrogen and the oxygen are dispersed in the aqueous reaction medium, composed of the working solution and of the catalyst, in proportions above the lower ignition limit of the hydrogen-oxygen mixture. A very fine dispersion of hydrogen and of oxygen is even required in the process disclosed in the documents Wo 96/05138 and FR 2 774 674.

To avoid any risk of explosion, the document WO 96/05138 recommends injecting the hydrogen and the oxygen at a very high rate into the tube reactor, requiring the injection of oxygen at a more advanced point in the direction of the movement of the aqueous medium with respect to that of hydrogen.

The Applicant Company has now found that the presence of a surface-active agent in an aqueous reaction medium as described above surprisingly increases the productive output. In addition, the surface-active agent makes it possible to operate with a hydrogen/oxygen ratio in the aqueous reaction medium which is below the lower ignition limit of the hydrogen-oxygen mixture.

A first subject matter of the present invention is a process for the manufacture of an aqueous hydrogen peroxide solution directly from hydrogen and oxygen. This process, according to which the hydrogen and the oxygen are injected in the form of small bubbles into an aqueous reaction medium which has been rendered acidic by the addition of an inorganic acid and which comprises a catalyst in the dispersed state, is characterized in that the aqueous reaction medium additionally comprises one or more surface-active agents.

Figure 1:
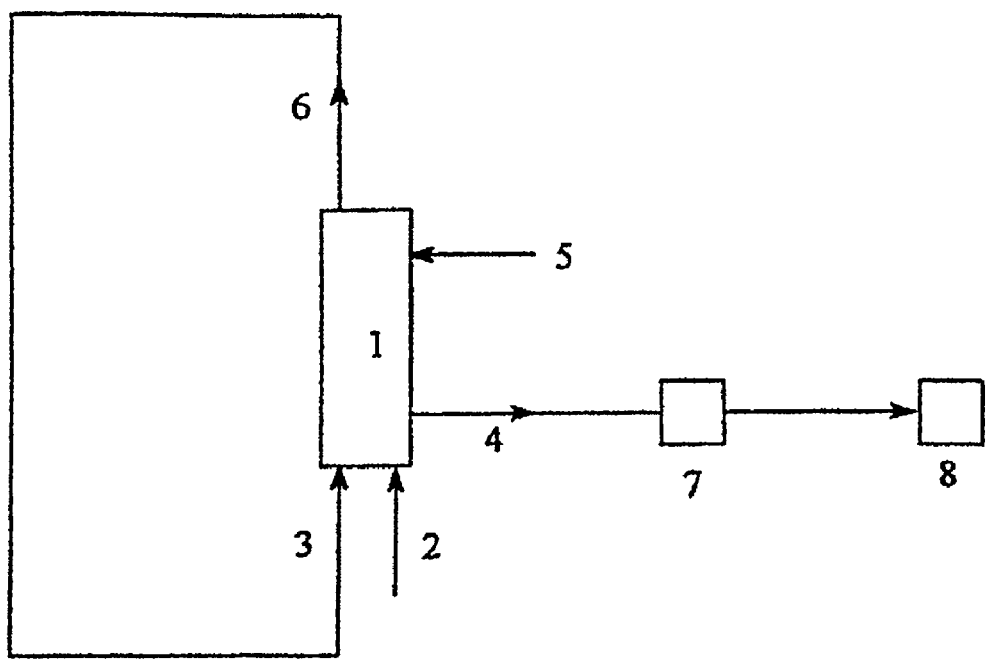
FIG. 1 is a diagrammatical representation of a device used to implement the process of the present invention.

The term "small bubbles" is understood to denote bubbles with a mean diameter of less than 3 mm, preferably with a mean diameter of between 0.1 and 2 mm.

Any surface-active agent which is stable in an acidic medium, preferably at a pH of 1 to 3, and which is resistant to highly oxidizing conditions (oxygen under high pressure and hydrogen peroxide) may be suitable.

Any molecule composed of a hydrophilic part (polar head) and of a hydrophobic part can be used as surface-active agent. Mention may be made, by way of examples, of dimethyllaurylamine oxide $(CH_3)_2C_{11}H_{23}NO$; phosphoric mono- and diester, in particular $C_8H_{17}$—O—$PO(OH)_2$, $(C_8H_{17}$—O$)_2$—POOH, $C_9H_{19}$—$C_6H_4$—O—$PO(OH)_2$ and $C_9H_{19}$—$C_6H_4$—O$)_2$—POOH; alkylbenzenesulfonic acid R—$C_6H_4$—$SO_3H$, it being possible for R to be, for example, a $C_{11}H_{23}$ or $C_9H_{19}$ alkyl chain; naphthalenesulfonic acid R—$C_{10}H_6$—$SO_3H$; alkyl sulfonic acid R—O—$SO_3H$; or polyoxyethyl sulfonic [lacuna] R—$(OC_2H_4)_n$—$OSO_3H$ and R—$C_6H_4$—$(OC_2H_4)_n$—$OSO_3H$.

Fluorinated surface-active agents are very particularly suitable because of the high chemical stability and the high hydrophobicity of the fluorocarbon chain. Indeed, fluorinated surface-active agents make it possible to lower the surface tension of water as far as 15–20 $mN.m^{-1}$ (Actualité Chimique, July 1999, page 3).

The hydrophilic chain of these fluorinated surface-active agents can be chosen from acid or polar groups exhibiting good chemical stability, such as, for example, —$SO_3H$, —COOH or —$PO(OH)_2$.

Mention may be made, by way of examples, of the fluorinated surface-active agents of general formula

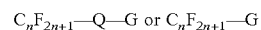

in which:

Q denotes a spacer arm, such as, for example, $C_2H_4$,

G denotes a hydrophilic group, such as, for example, —$SO_3H$, —COOH, —O—$PO(OH)_2$ or —$PO(OH)_2$.

The following surface-active agents:

$C_6F_{13}$—$C_2H_4$—$SO_3H$ $C_7F_{15}$—COOH

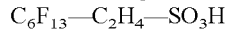

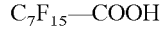
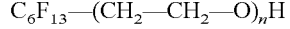

COOH and $C_6F_{13}$—$HC(CH_2Cl)$—O—$PO(OH)_2$, are particularly preferred.

The amount of surface-active agent charged is not critical. It is sufficient for it to be less than the minimum amount necessary to bring about the appearance of foams at the surface of the aqueous reaction medium.

The amount of surface-active agent involved is preferably between 50 to 90% of this minimum amount.

The optimum amount of surface-active agent involved depends on its nature and on the composition of the aqueous solution constituting the starting aqueous reaction medium.

The presence of a fluorinated surface-active agent in a proportion of 1 to 50 ppm and preferably in a proportion of 5 to 10 ppm in the aqueous reaction medium has given advantageous results.

Mention may in particular be made, as inorganic acid, of sulfuric acid, orthophosphoric acid and nitric acid. The acid is used in an amount sufficient to preferably keep the pH of the aqueous reaction medium between 1 and 3.

The aqueous reaction medium can additionally comprise stabilizers for hydrogen peroxide, such as, for example, phosphonates or tin, and decomposition inhibitors, such as, for example, halogenated derivatives.

The stabilizing agents are generally present in the aqueous reaction medium in a proportion of 100 to 5 000 ppm.

The stabilizing agents used can be chosen from commercial products or aminophosphonic acids of general formula $R_1R_2N$—$CH_2$—$PO(OH)_2$.

When the aqueous reaction medium is rendered acidic with orthophosphoric acid, the use of a stabilizing agent is unnecessary.

The preferred halogenated derivatives are chosen from alkali metal bromides and chlorides, hydrobromic acid, hydrochloric acid and bromine in the gaseous state or in solution in water (bromine water). Use is advantageously made of the bromide and, preferably in combination with bromine in the free state ($Br_2$).

The amount of bromide (in the form of NaBr or of HBr), when it is present in the aqueous reaction medium, is generally between 10 and 200 ppm and preferably between 20 and 100 ppm.

The amount of bromine (gaseous $Br_2$ or $Br_2$ in solution in water), when it is present in the aqueous reaction medium, is generally between 1 and 50 ppm and preferably between 2 and 10 ppm.

The catalyst used is generally a supported catalyst based on at least one metal chosen from the group M formed of palladium, platinum, ruthenium, rhodium, iridium, osmium, holmium and gold and in particular a supported bimetallic catalyst. The supported bimetallic catalyst is generally composed of a major metal from the group M and of another minor metal from the group M. The major metal represents approximately 0.1 to 10% by weight of the catalyst and preferably between 0.5 to 1% by weight. The minor metal represents approximately 0.001 to 0.1% by weight of the catalyst and preferably between 0.01 and 0.05%.

Palladium and gold are advantageously chosen as major metal.

Platinum and holmium are advantageously chosen as minor metal.

The supported bimetallic catalyst which is particularly preferred is composed of palladium as major metal and of platinum as minor metal.

It is preferable to use, as supported polymetallic catalyst composed of a major metal from the group M and of several other minor metals from the group M, that comprising palladium as major metal and platinum and at least one metal from the group M, other than palladium and platinum, as minor metals.

The content of major metal in the supported polymetallic catalyst is virtually the same as that of the major metal in the bimetallic catalyst and each minor metal can be present in the catalyst in an amount representing approximately 0.001 to 0.1% by weight of the catalyst and preferably between approximately 0.01 and 0.05%.

In the case of a supported monometallic catalyst, it is preferable to choose palladium or gold as metallic constituent from the group M with a content generally of between 0.1 and 10% by weight of catalyst and preferably between 0.5 and 1% by weight.

Although alumina, carbon and aluminosilicates may be suitable as support, it is preferable, however, to use silica and advantageously silica particles with a mean size of between 1 and 50 μm. It is also preferable to use silica with a BET specific surface of greater than 200 $m^2$/g and generally of between 300 and 600 $m^2$/g. The microporous silica from Aldrich referenced 28,851–9 has proved to be particularly advantageous.

The level of iron (Fe) in the chosen support is preferably less than 0.001% by weight.

The catalyst employed in the process of the present invention can be prepared according to the method disclosed in U.S. Pat. No. 4,772,458 but it is preferable to prepare it according to the method consisting in:

a) bringing a support, chosen from the group formed by silica, alumina, carbon and aluminosilicate, into contact with a concentrated aqueous solution of salt(s) of at least one metal from the group M, so as to form a paste, b) followed by the filtration, the superficial drying and then the drying of the paste under conditions which favor slow crystallization, c) then by the reduction under hydrogen at approximately 200 to 400° C. of the dried solid from stage (b), d) subsequently by the treatment of the reduced solid from stage (c) with an acidic aqueous solution (A), comprising bromine and bromide ions, at a temperature of between 10 and 80° C., e) and, finally, filtration of the solid treated in stage (d) and drying at a temperature of between 100 and 140° C.

The pH of the solution (A) is preferably between 1 and 3. The concentration of the bromide ions in the solution (A) can be between 20 and 200 mg/l and preferably between 20 and 100 mg/l and the concentration of bromine ($Br_2$) can be between 2 and 20 mg/l.

According to the process of the present invention, it is possible to carry out the reaction both continuously and semicontinuously.

The process can be implemented in a stirred reactor which comprises a stirring system which makes possible the dispersion of the gases in a liquid phase and which is equipped with an internal or external cooling system capable of removing the heat of the reaction.

The stirred reactor can, for example, be a cylindrical autoclave equipped with one or more stirrers of the type of those used for gas-liquid reactions (self-suction turbine, flanged turbine, turbines with concave blades, and the like) and with an internal cooling system composed of a coil, of vertical tube bundles or else of a spiral plate or tube.

Conventional reactors for implementation of hydrogenation reactions are highly suitable.

The process can also be implemented in a loop reactor composed of a reactor and of a high-throughput pump situated outside the reactor which sucks up the aqueous reaction medium in the lower part of the reactor and conveys it to the upper part. A heat exchanger can be placed in the circulation loop, along with a system for injecting the gases (oxygen, hydrogen), such as, for example, a venturi.

The rapid circulation of the aqueous reaction medium provides for stirring in the reactor and the dispersion of the bubbles.

The process according to the invention can also be implemented in a tube reactor composed of one or more very long tubes.

Whatever the reactor, the temperature and the pressure prevailing internally are adjusted in order to optimize the selectivity of the reaction with respect to the hydrogen and the productive output of hydrogen peroxide. This temperature is generally between 5 and 90° C. and preferably between 30 and 60° C.

The pressure prevailing inside the reactor is generally above atmospheric pressure and preferably between 10 and 100 bar.

Although the hydrogen and the oxygen can be present in the aqueous medium in proportions corresponding to the ignition range of the hydrogen-oxygen mixture, it is generally preferable to inject the hydrogen and the oxygen separately in the form of small bubbles with flow rates such that the ratio of the hydrogen molar flow rate to the oxygen molar flow rate is less than 0.0416.

When the reaction is carried out semicontinuously, the aqueous hydrogen peroxide solution resulting from the reaction is separated from the catalyst and then optionally freed from the additives, such as surfactants, inhibitors and stabilizers. The additives can thus be recovered and used in a further operation.

When the reaction is carried out continuously, the separation of the catalyst from the aqueous hydrogen peroxide solution and that of the additives can be carried out continuously.

The separation of the additives from the aqueous hydrogen peroxide solution is preferably carried out by reverse osmosis using membranes identical to those used for the desalination of sea water.

The transmembrane pressure is between 20 and 130 bar and preferably 30 to 80 bar, according to the type of membrane.

Preferably, use is made of 1 to 3 separation stages.

Preferably, the permeate flow rate is between 0.7 and 0.95 times the feed flow rate for the stage.

Preferably, the membranes used are of the bilayer type (2 superimposed layers of polymers, including at least one polyamide layer) or else of the trilayer type (3 superimposed layers of polymers, including at least one polyamide layer).

Use was made, as bilayer membrane, of the "Dow Filmtec-SW30" membrane and use was made, as trilayer membrane, of the "Osmonics-Desal 3" membrane.

A second subject matter of the invention is a device which makes possible the implementation of the process as described above. This device, represented diagrammatically in FIG. 1, comprises a reactor 1 equipped with one or more inlets (2) for gaseous hydrogen and with one or more inlets (3) for gaseous oxygen, with a liquid inlet (5), with a liquid outlet (4) and with a gas outlet (6) which can optionally be connected to the inlet (3). According to one alternative form, the outlet (4) is connected to a filter (7) which is itself connected to membranes (8).

Figure 2:
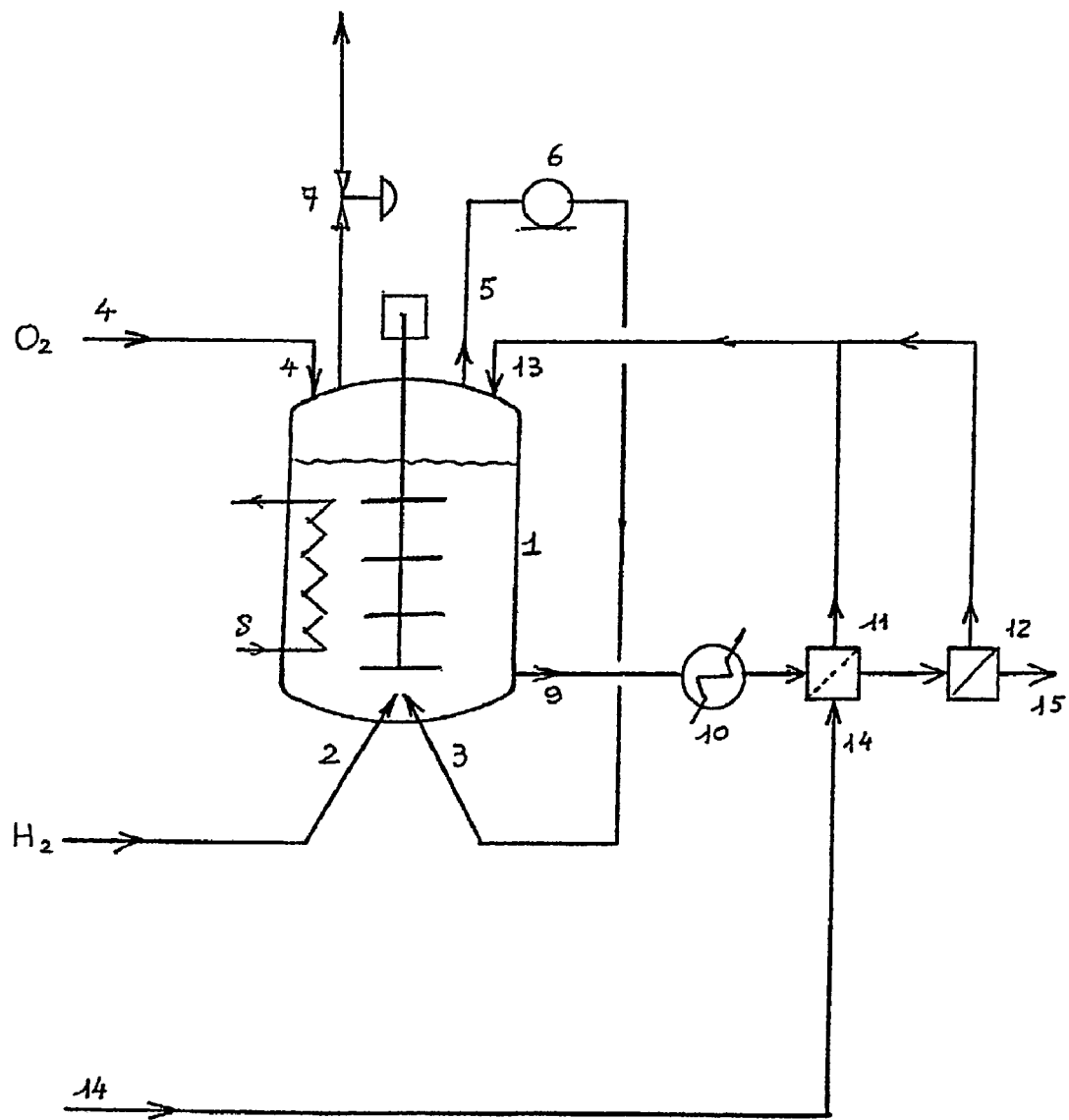
FIG. 2 represents a device and an operating diagram illustrating a specific embodiment of the process of the present invention.

A device and an operating diagram illustrating a specific embodiment of the process of the present invention, which are represented in FIG. 2, are described below.

The device comprises a stirred reactor 1 equipped with several centrifugal turbines positioned along a single vertical stirrer shaft. At startup, the reactor comprises the catalyst in suspension in the aqueous solution comprising the surface-active agent, the inhibitor and the stabilizer, the combined mixture being brought to the reaction temperature.

The fresh hydrogen, at 2, and oxygen, at 3, are injected separately in the form of small bubbles into the lower part of the reactor, using two adjacent nozzles placed under the suction orifice of the turbine situated at the bottom of the reactor.

The hydrogen flow rate at 2 and the oxygen flow rate at 3 are chosen so as to obtain a gaseous composition in the aqueous reaction medium which is preferably nonignitable, that is to say with a hydrogen concentration not exceeding the lower ignition limit of the hydrogen-oxygen mixture at the pressure prevailing inside the reactor. Generally, this limit is 4% by volume of hydrogen at 1 bar (absolute) and 6% at 50 bar.

Fresh oxygen is injected at 4 into the upper part of the reactor, occupied by the continuous gas phase, in order to replace the oxygen consumed and also in order to keep the composition in this phase below the lower ignition limit of the hydrogen-oxygen mixture.

The oxygen injected at 3 originates, in all or in part, from the gas stream withdrawn at 5 and circulated via the pump 6. It may comprise a small amount of unreacted hydrogen.

The oxygen used can comprise a small proportion of inert gases, such as those present in air, for example nitrogen or argon.

When the oxygen is accompanied by inert gases, it is then necessary to carry out bleeding operations using the control valve 7, so that the concentration of inert gases in the continuous gas phase is less than 50% by volume and preferably less than 30%.

The temperature of the reaction medium is kept constant by circulation of cooling water in the coils 8.

The aqueous solution comprising the hydrogen peroxide formed leaves the reactor via the outlet 9, is then cooled in the exchanger 10 and is subsequently filtered at 11.

The catalyst suspension which has not passed through the filtering surface 11 returns to the reactor at 13. The filter at 11 is alternately unblinded by countercurrentwise injection of demineralized water, optionally comprising acid and additives (surfactant, inhibitor, stabilizer), at 14 through the filtering surface. The resuspended catalyst returns to the reactor at 13.

The clear aqueous hydrogen peroxide solution originating from 11 is subsequently introduced into the array of reverse osmosis membranes 12.

The permeate from the nth cell is introduced into the (n+1) cell and the retentate (or concentrate) returns to the reactor at 13, and so on for each stage of the reverse osmosis unit.

The permeate from the final cell is a virtually pure aqueous $H_2O_2$ solution 15.

Most of the additives are recycled to the reactor at 13.

Demineralized water is introduced at 14 to keep the level of the liquid phase constant in the reactor. The additives (surfactant, inhibitor, stabilizer) are added in this water to keep their contents in the aqueous reaction medium constant.

Figure 3:
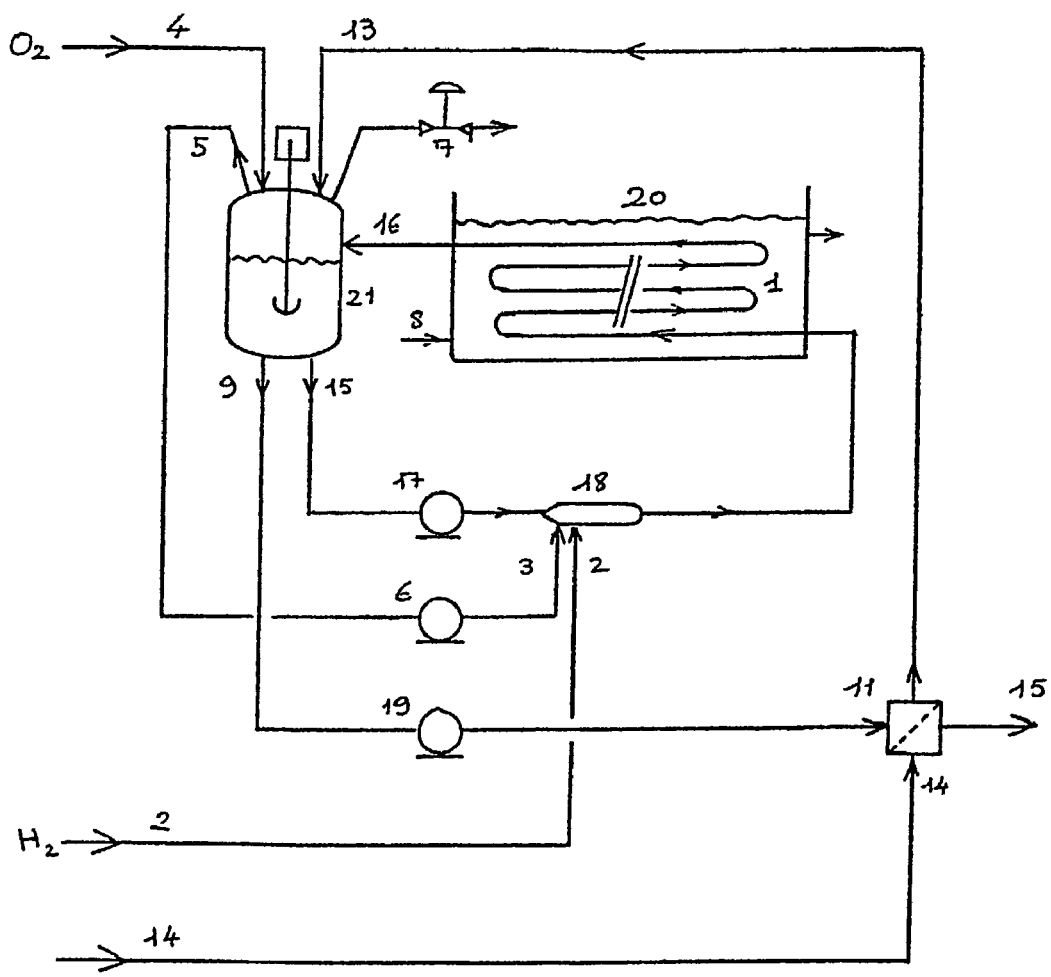
FIG. 3 represents a device and an operating diagram illustrating another specific embodiment of the process of the present invention.

A device and an operating diagram which are represented in FIG. 3 illustrate another specific embodiment of the process of the present invention.

The device of FIG. 3 comprises a tank 21 comprising, at startup, the aqueous solution comprising the additives and the suspended catalyst.

A pump 17 circulates this aqueous catalyst suspension at high speed through a tube reactor 1 composed of one or more very long tubes immersed in a thermostatically-controlled bath 20.

The oxygen is withdrawn at 5 from the continuous gas phase of the tank 21 by means of the compressor 6 and is then injected at 3 into the tube reactor in the form of small bubbles by means of a venturi 18 and by virtue of the high rate of circulation of the aqueous catalyst suspension.

The fresh oxygen is injected at 4 into the continuous gas phase of the tank 21.

The fresh hydrogen 2 is injected in the form of small bubbles into the tube reactor 1, also by means of the venturi 18.

At the outlet of the tube reactor, the aqueous catalyst suspension and the bubbles of unreacted $H_2$ and $O_2$ are returned to the tank 21 at 16.

The aqueous hydrogen peroxide solution comprising the suspended catalyst is withdrawn at 9 from the tank 21 via the pump 19 and then feeds the filter 11. The excess catalyst suspension is returned to the reactor at 13.

The filtered $H_2O_2$ solution exits from the filter 11 at 15.

The filter 11 is periodically unblinded by injection of the aqueous acidic solution at 14 (the outlet 15 is then closed).

A pressure regulator 7 discharges the excess $O_2$ and $H_2$ and inert gas from the reactor. A reverse osmosis unit can also be connected to the outlet 15 to recycle the additives.

EXPERIMENTAL PART

Device for the Direct Synthesis of an Aqueous Hydrogen Peroxide Solution

The device is similar to that represented in FIG. 2.

The reactor, with a capacity of 1 500 cm³, is composed of a cylindrical vessel with a height of 200 mm and a diameter of 98 mm.

The bottom and the top are flat.

A removable sleeve tube made of PTFE with a thickness of 1.5 mm is placed in the bowl of the reactor.

Stirring is provided by a vertical shaft of stainless steel with a length of 180 mm and a diameter of 8 mm driven by a magnetic coupling placed on the top of the reactor.

Two or three flanged turbines with an external diameter of 45 mm and a thickness of 9 mm (between the two flanges), which turbines are equipped with a downwardly directed suction orifice with a diameter of 12.7 mm and with 8 flat radial vanes with a width of 9 mm, a length of 15 mm and a thickness of 1.5 mm, can be attached to the stirrer shaft at various heights chosen so as to divide the liquid phase into substantially equal volumes.

The bottom turbine is placed at 32 mm from the bottom, the second turbine at 78 mm from the bottom and the third at 125 mm from the bottom.

Four baffles with a height of 190 mm, with a width of 10 mm and with a thickness of 1 mm are placed vertically in the vessel perpendicular to the internal wall of the reactor and are held 1 mm from this wall by two centering rings.

Cooling or heating is provided by eight vertical tubes with a diameter of 6.35 mm and a length of 150 mm positioned in a ring at 35 mm from the axis of the vessel.

A stream of water at a constant temperature flows through this coil.

The hydrogen and the oxygen are injected into the liquid phase by means of two separate stainless steel pipes with a diameter of 1.58 mm for $O_2$ and 3.17 mm for $O_2$ which lead the gases to the center of the bottom turbine. The injection of the gaseous reactants into the aqueous medium and the injection of the oxygen into the continuous gas phase are regulated using mass flowmeters. Some tests were carried out in which the oxygen was replaced by an oxygen-nitrogen mixture in various proportions.

The pressure prevailing inside the reactor is kept constant by virtue of a release valve.

The hydrogen, the oxygen and optionally the nitrogen constituting the gas stream exiting from the reactor are quantitatively determined in line by gas chromatography.

Preparation of the Catalyst

The catalyst used comprises 0.7% by weight of palladium metal and 0.03% by weight of platinum, these metals being supported on a microporous silica.

It is prepared by impregnation of the silica (Aldrich, ref. 28,851–9), with the following characteristics:

| | |
|---|---|
| Mean size of the particles | = 5 to 15 µm |
| BET specific surface | = 500 m²/g |
| Volume of the pores | = 0.75 cm³/g |
| Mean diameter of the pores | = 60 Å, | with an aqueous solution comprising $PdCl_2$ and $H_2PtCl_6$, followed by slow drying and finally by a heat treatment at 300° C. for 3 hours while flushing with hydrogen.

The catalyst is subsequently suspended (10 g/l) in a solution, comprising 60 mg of NaBr, 5 mg of $Br_2$ and 12 g of $H_3PO_4$, heated at 40° C. for 5 hours, and is then filtered off, washed with demineralized water and dried.

Starting Aqueous Solution (EXAMPLES 1–19)

An aqueous solution is prepared by addition of 12 g of $H_3PO_4$, 58 mg of NaBr and 5 mg of $Br_2$ to 988 g of demineralized water.

Starting Aqueous Solution (EXAMPLES 20–24)

The aqueous solution used comprises 3.4% of $H_3PO_4$, 90 ppm of bromide (NaBr) and 5 ppm of $Br_2$.

General Procedure

The chosen amount of starting aqueous solution is introduced into the autoclave and then the predetermined amount of surface-active agent and of catalyst is added. The autoclave is pressurized by injection of a chosen flow rate of oxygen into the continuous gas phase. The pressure remains constant by virtue of the pressure regulator. The liquid medium is brought to the chosen temperature by circulation of thermostatically-controlled water in the bundle of cooling tubes.

Stirring is adjusted to 1 900 rev/min and the chosen flow rates of oxygen and of hydrogen are injected at the center of the bottom turbine.

The flow rate of and the content of hydrogen in the gas mixture exiting from the pressure regulator are measured.

After reacting for 1, 1.5, 2 or 3 hours, the delivery of hydrogen and of oxygen to the aqueous reaction medium is halted and the injection of oxygen into the continuous gas phase is maintained until hydrogen has completely disappeared from the latter. The delivery of oxygen is then halted, the reactor is then decompressed and, finally, the aqueous hydrogen peroxide solution is recovered.

The aqueous hydrogen peroxide solution recovered is subsequently weighed and then separated from the catalyst by filtration through a Millipore® filter.

The resulting solution is then quantitatively determined by iodometry, thus making it possible to determine the concentration of hydrogen peroxide. The selectivity of the synthesis is defined as being the percentage of the number of moles of hydrogen peroxide formed with regard to the number of moles of hydrogen consumed.

The degree of conversion is defined as being the percentage of the volume of hydrogen consumed with regard to volume of hydrogen introduced.

The results obtained under various reaction conditions are shown in tables 1, 2 and 3.

EXAMPLE 25

Separation of the additives by reverse osmosis

A solution comprising 200 g/l of hydrogen peroxide, 6 g/l of orthophosphoric acid and 50 mg/l of NaBr is pumped into a reverse osmosis unit composed of 3 cells mounted in series with an operating pressure of 80 bar and a concentration factor by volume of 10 per cell. Each cell is equipped with a trilayer membrane with the reference Osmonics-Desal 3 supplied by Desal. The following results are obtained:

|  | 1st cell | 2nd cell | 3rd cell |
| --- | --- | --- | --- |
| Permeate flow rate | 0.9 Q | 0.81 Q | 0.729 Q |
| Retentate flow rate | 0.1 Q | 0.09 Q | 0.081 Q |
| [Br$^-$] permeate (mg/l) | 26.31 | 13.85 | 7.29 |
| [Br$^-$] retentate | 263.1 | 138.5 | 72.9 |
| [PO$_4^{3-}$] permeate (mg/l) | 287.1 | 48.66 | 16.78 |
| [PO$_4^{3-}$] retentate | 57 418 | 2 433 | 335.6 |
| Product flow rate | | | 0.729 Q |
| Recycled flow rate | | | 0.271 Q |
| [Br$^-$] recycled | | | 165 mg/l |
| [PO$_4^{3-}$] recycled | | | 22 095 mg/l |

Q being the feed flow rate of the first cell.

It is found that 89% of the bromides and 99% of the phosphates are recycled.

TABLE 1

| Example | Nature of the surfactant | Amount of surfactant mg | Amount of starting aqueous solution g | Amount of catalyst g | Number of turbines | Flow rate H$_2$ injected into the bottom turbine Sl/h | Flow rate O$_2$ injected into the bottom turbine Sl/h | Flow rate N$_2$ injected into the bottom turbine Sl/h | Flow rate O$_2$ injected into the gas phase Sl/h |
| --- | --- | --- | --- | --- | --- | --- | --- | --- | --- |
| 1 | None | 0 | 700 | 6 | 2 | 180 | 4 320 | 0 | 0 |
| 2 | Noramox S 25/40 (Ceca) | 5 | 700 | 6 | 2 | 180 | 4320 | 0 | 0 |
| 3 | C$_7$F$_{15}$COOH | 5 | 700 | 6 | 2 | 180 | 4 320 | 0 | 0 |
| 4 | C$_7$F$_{15}$COOH | 10 | 700 | 6 | 2 | 180 | 4 320 | 0 | 0 |
| 5 | C$_6$F$_{13}$C$_2$H$_4$SO$_3$H | 5 | 700 | 12 | 2 | 180 | 4 320 | 0 | 0 |
| 6 | C$_7$F$_{15}$COOH | 5 | 700 | 6 | 2 | 180 | 2 820 | 0 | 1000 |
| 7 | None | 0 | 1000 | 8.5 | 3 | 180 | 4 320 | 0 | 0 |
| 8 | C$_7$F$_{15}$COOH | 5 | 700 | 6 | 2 | 180 | 4 320 | 0 | 0 |
| 9 | C$_6$F$_{13}$C$_2$H$_4$SO$_3$H | 5 | 700 | 6 | 2 | 180 | 4 320 | 0 | 0 |
| 10 | C$_7$F$_{15}$COOH | 5 | 700 | 12 | 2 | 180 | 4 320 | 0 | 0 |
| 11 | C$_{12}$H$_{25}$C$_6$H$_4$SO$_3$H | 5 | 700 | 12 | 2 | 180 | 4 320 | 0 | 0 |
| 12 | C$_6$F$_{13}$C$_2$H$_4$SO$_3$H | 5 | 700 | 12 | 2 | 180 | 4 320 | 0 | 0 |

| Example | Nature of the surfactant | Pressure in the reactor bar | Temperature in the reactor °C. | Concentration of H$_2$O$_2$ in the aqueous solution after reaction % (weight) | Selectivity of the reaction with respect to the hydrogen % | Degree of conversion of the hydrogen % |
| --- | --- | --- | --- | --- | --- | --- |
| 1 | None | 63 | 60 | 5.8 | 100 | 15.7 |
| 2 | Noramox S 25/40 (Ceca) | 63 | 60 | 6.8 | 100 | 18.8 |
| 3 | C$_7$F$_{15}$COOH | 63 | 60 | 7.3 | 100 | 20.3 |
| 4 | C$_7$F$_{15}$COOH | 63 | 60 | 7.5 | 99 | 20.9 |
| 5 | C$_6$F$_{13}$C$_2$H$_4$SO$_3$H | 63 | 60 | 10.7 | 92 | 33.4 |
| 6 | C$_7$F$_{15}$COOH | 63 | 60 | 10.1 | 89 | 32.7 |
| 7 | None | 64 | 50 | 4.9 | 100 | 18.9 |
| 8 | C$_7$F$_{15}$COOH | 63 | 50 | 6.1 | 100 | 16.7 |
| 9 | C$_6$F$_{13}$C$_2$H$_4$SO$_3$H | 63 | 50 | 6.6 | 100 | 18.2 |
| 10 | C$_7$F$_{15}$COOH | 63 | 50 | 8.6 | 97 | 24.9 |
| 11 | C$_{12}$H$_{25}$C$_6$H$_4$SO$_3$H | 60 | 50 | 8.0 | 96 | 23.2 |
| 12 | C$_6$F$_{13}$C$_2$H$_4$SO$_3$H | 60 | 50 | 8.1 | 100 | 22.5 |

*Results obtained after reacting for one hour.

TABLE 2

| Example | Nature of the surfactant | Amount of surfactant mg | Amount of starting aqueous solution g | Amount of catalyst g | Number of turbines | Flow rate $H_2$ injected into the bottom turbine Sl/h | Flow rate $O_2$ injected into the bottom turbine Sl/h | Flow rate $N_2$ injected into the bottom turbine Sl/h | Flow rate $O_2$ injected into the gas phase Sl/h |
|---|---|---|---|---|---|---|---|---|---|
| 13 | $C_6F_{13}C_2H_4SO_3H$ | 5 | 700 | 12 | 2 | 180 | 4 320 | 0 | 0 |
| 14 | $C_6F_{13}C_2H_4SO_3H$ | 5 | 700 | 12 | 2 | 180 | 4 320 | 0 | 0 |
| 15 | $C_6F_{13}C_2H_4SO_3H$ | 5 | 700 | 12 | 2 | 180 | 4 320 | 0 | 0 |
| 16 | $C_6F_{13}C_2H_4SO_3H$ | 5 | 700 | 12 | 2 | 180 | 3 024 | 1296 | 0 |
| 17 | $C_6F_{13}C_2H_4SO_3H$ | 5 | 700 | 12 | 2 | 180 | 2 160 | 2160 | 0 |
| 18 | None | 0 | 1000 | 8.5 | 3 | 180 | 2 160 | 2160 | 0 |
| 19 | None | 0 | 1000 | 8.5 | 3 | 180 | 4320 | 0 | 0 |

| Example | Nature of the surfactant | Pressure in the reactor bar | Temperature in the reactor °C. | Concentration of $H_2O_2$ in the aqueous solution after reaction % (weight) | Selectivity of the reaction with respect to the hydrogen % | Degree of conversion of the hydrogen % |
|---|---|---|---|---|---|---|
| 13 | $C_6F_{13}C_2H_4SO_3H$ | 55 | 60 | 9.5 | 91 | 29.7 |
| 14 | $C_6F_{13}C_2H_4SO_3H$ | 35 | 60 | 6.9 | 99 | 19.2 |
| 15 | $C_6F_{13}C_2H_4SO_3H$ | 25 | 60 | 5.1 | 100 | 13.9 |
| 16 | $C_6F_{13}C_2H_4SO_3H$ | 25 | 60 | 6.2 | 100 | 16.9 |
| 17 | $C_6F_{13}C_2H_4SO_3H$ | 12 | 60 | 3.7 | 100 | 9.8 |
| 18 | None | 35 | 60 | 3.2 | 94 | 12.6 |
| 19 | None | 55 | 60 | 5.6 | 95 | 22.8 |

*Results obtained after reacting for one hour.

TABLE 3

| Example | Nature of the surfactant | Amount of surfactant mg | Amount of starting aqueous solution g | Amount of catalyst g | Number of turbines | Reaction duration h | Flow rate $H_2$ injected into the bottom turbine Sl/h | Flow rate $O_2$ injected into the bottom turbine Sl/h | Flow rate $N_2$ injected into the bottom turbine Sl/h | Flow rate $O_2$ injected into the gas phase Sl/h |
|---|---|---|---|---|---|---|---|---|---|---|
| 20 | $C_6F_{13}C_2H_4SO_3H$ | 5 | 700 | 12 | 2 | 1.5 | 180 | 4 320 | 0 | 0 |
| 21 | $C_6F_{13}C_2H_4SO_3H$ | 5 | 500 | 12 | 2 | 1 | 180 | 3 320 | 1000 | 0 |
| 22 | $C_6F_{13}C_2H_4SO_3H$ | 5 | 700 | 12 | 2 | 1 | 180 | 4 320 | 0 | 0 |
| 23 | $C_6F_{13}C_2H_4SO_3H$ | 5 | 500 | 12 | 2 | 1 | 180 | 4 320 | 0 | 0 |
| 24 | $C_6F_{13}C_2H_4SO_3H$ | 5 | 500 | 12 | 2 | 1 | 180 | 2 820 | 0 | 1000 |

| Example | Nature of the surfactant | Pressure in the reactor bar | Temperature in the reactor °C. | Concentration of $H_2O_2$ in the aqueous solution after reaction % (weight) | Selectivity of the reaction with respect to the hydrogen % | Degree of conversion of the hydrogen % |
|---|---|---|---|---|---|---|
| 20 | $C_6F_{13}C_2H_4SO_3H$ | 61 | 50 | 10.4 | 99 | 20.1 |
| 21 | $C_6F_{13}C_2H_4SO_3H$ | 62 | 50 | 11.0 | 97 | 23.5 |
| 22 | $C_6F_{13}C_2H_4SO_3H$ | 60 | 60 | 10.3 | 95 | 31.2 |
| 23 | $C_6F_{13}C_2H_4SO_3H$ | 51 | 50 | 17.2 | 92 | 20.7 |
| 24 | $C_6F_{13}C_2H_4SO_3H$ | 61 | 28 | 18.7 | 95 | 14.8 |

What is claimed is:

1. A process for manufacture of an aqueous hydrogen peroxide solution directly from hydrogen and oxygen, which comprises injecting the hydrogen and the oxygen in a form of small bubbles into an aqueous reaction medium which has been rendered acidic by addition of an inorganic acid and which comprises a catalyst in a dispersed state and at least one surface-active agent wherein the surface-active agent is a fluorinated surface-active agent.

2. The process as claimed in claim 1, wherein the fluorinated surface-active agent is of general formula $C_nF_{2n+1}$—Q—G or $C_nF_{2n+1}$—G, in which Q denotes a spacer arm and G denotes a hydrophilic group.

3. The process as claimed in claim 1, wherein the amount of surface-active agent employed is less than the minimum amount necessary to bring about the appearance of foams at the surface of the aqueous reaction medium.

4. The process as claimed in claim 1, wherein the surface-active agent is present in a proportion of 1 to 50 ppm in the aqueous reaction medium.

5. The process as claimed in claim 1, wherein the reaction medium comprises stabilizers or hydrogen peroxide.

6. The process as claimed in claim 1, wherein the reaction medium comprises decomposition inhibitors.

7. The process as claimed in claim 6, wherein the decomposition inhibitor is selected from the group consisting of bromide of an alkali metal, hydrobromic acid, and those in combination with bromine in free state.

8. the process as claimed in claim 7, wherein the amount of bromide in the aqueous reaction medium is between 10 and 200 ppm.

9. The process as claimed in claim 7, wherein the amount of bromine in the aqueous reaction medium is between 20 and 100 ppm.

10. The process as claimed in claim 1, wherein the catalyst is a supported catalyst based on at least one metal which is selected from the group M consisting of palladium, platinum, ruthenium, rhodium, iridium, osmium, holmiun and gold.

11. The process as claimed in claim 10, wherein the supported catalyst is a bimetallic catalyst composed of palladium as major metal and of platinum as minor metal.

12. The process as claimed in claim 11, wherein the bimetallic catalyst is supported on silica.

13. The process as claimed in claim 10, wherein the catalyst is prepared according to a method comprising:
   f. bringing a support, which is selected from the group consisting of silica, alumina, carbon and aluminosilicate, into contact with a concentrated aqueous solution of salt(s) of at least one metal which is selected from the group M, so as to form a paste,
   g. filtrating the paste, the superficial drying and then the drying of the paste under conditions which favor slow crystallization,
   h. then reducing the dried solid from stage {b} under hydrogen at approximately 200 to 400° C.,
   i. subsequently treating the reduced solid from stage (c) with an acidic aqueous solution (A), comprising bromine and bromide ions, at a temperature of between 10 and 80° C., and
   j. finally, filtering the solid treated in stage (d) and drying at a temperature of between 100 and 140° C.

14. The process as claimed in claim 13, wherein the pH of the solution (A) is between 1 and 3.

15. The process as claimed in claim 13, wherein the concentration of the bromide ions in the acidic solution (A) is between 20 and 200 mg/l.

16. The process as claimed in claim 15, wherein the concentration of bromine is between 20 and 100 mg/l.

17. The process as claimed in claim 1, wherein it is implemented in a stirred reactor or tube reactor.

18. The process as claimed in claim 1, wherein the temperature of the reaction medium is between 5 and 90° C.

19. The process as claimed in claim 1, wherein the reaction medium is under a pressure of 10 to 100 bar.

20. The process as claimed in claim 1, wherein the hydrogen and the oxygen are injected separately into the aqueous reaction medium with flow rates such that the ratio of the hydrogen molar flow rate to the oxygen molar flow rate is less than 0.0416.

21. The process as claimed in claim 1, wherein the aqueous hydrogen peroxide solution formed is separated from the catalyst and then purified by reverse osmosis using membranes.

22. The process as claimed in claim 21, wherein the membranes are polymer bilayer or trilayer type, including at least one polyamide-based layer.

* * * * *